(12) United States Patent
Chaitanya

(10) Patent No.: US 9,710,805 B2
(45) Date of Patent: Jul. 18, 2017

(54) PREPAID WALLET FOR MERCHANTS

(75) Inventor: Somisetty Krishna Chaitanya, Andra Pradesh (IN)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 13/525,575

(22) Filed: Jun. 18, 2012

(65) Prior Publication Data

US 2013/0339231 A1 Dec. 19, 2013

(51) Int. Cl.
| | | |
|---|---|---|
| G06Q 40/00 | (2012.01) | |
| G06Q 20/36 | (2012.01) | |
| G06Q 20/40 | (2012.01) | |
| G06Q 20/12 | (2012.01) | |
| G06Q 20/06 | (2012.01) | |
| G06Q 20/28 | (2012.01) | |

(52) U.S. Cl.
CPC ......... *G06Q 20/36* (2013.01); *G06Q 20/0655* (2013.01); *G06Q 20/12* (2013.01); *G06Q 20/28* (2013.01); *G06Q 20/40* (2013.01)

(58) Field of Classification Search
CPC .................................................. G06Q 20/40
USPC ..................................................... 705/39, 44
See application file for complete search history.

(56) References Cited

U.S. PATENT DOCUMENTS

| | | |
|---|---|---|
| 5,883,810 A | 3/1999 | Franklin et al. |
| 6,327,578 B1 | 12/2001 | Linehan |
| 6,422,462 B1 | 7/2002 | Cohen |
| 8,121,945 B2 | 2/2012 | Rackley, III et al. |
| 8,145,568 B2 | 3/2012 | Rackley, III et al. |
| 8,160,959 B2 | 4/2012 | Rackley, III et al. |
| 8,307,412 B2 | 11/2012 | Ozzie et al. |
| 2002/0059103 A1 | 5/2002 | Anderson et al. |
| 2002/0152179 A1* | 10/2002 | Racov ............................ 705/67 |
| 2003/0061170 A1* | 3/2003 | Uzo .............................. 705/64 |
| 2003/0105710 A1* | 6/2003 | Barbara et al. ................ 705/39 |
| 2004/0122737 A1 | 6/2004 | Celi, Jr. et al. |
| 2005/0109638 A1 | 5/2005 | Eastman |
| 2005/0109838 A1 | 5/2005 | Linlor |
| 2007/0011099 A1 | 1/2007 | Sheehan |
| 2007/0022058 A1 | 1/2007 | Labrou et al. |
| 2007/0027803 A1 | 2/2007 | Brandes et al. |
| 2007/0244757 A1* | 10/2007 | Walter ............................ 705/14 |
| 2008/0077526 A1 | 3/2008 | Arumugam |
| 2010/0054429 A1 | 3/2010 | Tonini |
| 2010/0082481 A1 | 4/2010 | Lin et al. |
| 2010/0114775 A1 | 5/2010 | Griffin |
| 2010/0114776 A1 | 5/2010 | Weller et al. |
| 2010/0153265 A1 | 6/2010 | Hershfield et al. |

(Continued)

OTHER PUBLICATIONS

PCT International Search Report and the Written Opinion mailed Jan. 3, 2014, in related International Application No. PCT/US2013/045932.

*Primary Examiner* — Edward Chang
(74) *Attorney, Agent, or Firm* — Haynes and Boone, LLP.

(57) ABSTRACT

A system including a memory storing user account information with a payment provider associated with specific merchants, and a method for use of the system are provided. The system includes one or more processors in communication with the memory and adapted to: receive login information from a user from a merchant website; access an account of the user with the payment provider; cause information for the account of the user to be displayed on the merchant website; and process a payment to the merchant from the account of the user.

18 Claims, 8 Drawing Sheets

(56) References Cited

U.S. PATENT DOCUMENTS

2010/0216425 A1    8/2010   Smith
2013/0024366 A1    1/2013   Mukherjee et al.

\* cited by examiner

PREPAID WALLET FOR MERCHANTS

BACKGROUND

1. Field of the Invention

Embodiments described herein relate to the field of online commerce. More particularly, embodiments described herein are related to the field of remote vending transactions using alternative payment methods.

2. Description of Related Art

With the rapid evolution of online commerce, buyers have greater accessibility to products from a larger pool of merchants. Buyers have gained access to products for sale during a wide range of time periods and locations, which adds a pressure to make payment methods available to buyers at the time of purchase selection. In many instances, buyers may not be able to instantly provide payment for a selected product, while still interested in the purchase. In those situations, state-of-the-art systems typically release the selected product from the buyer and the sale opportunity is essentially lost.

What is needed is an alternative method of payment for online commerce that is flexible and increases a sales opportunity for the buyer and the merchant.

SUMMARY

According to embodiments disclosed herein a system may include a memory storing user account information with a payment provider associated with specific merchants; and one or more processors in communication with the memory and adapted to: receive login information from a user from a merchant website; access an account of the user with the payment provider; cause information for the account of the user to be displayed on the merchant website; and process a payment to the merchant from the account of the user.

Further according to some embodiments a non-transitory machine-readable medium may have a plurality of machine-readable instructions which when executed by one or more processors of a server are adapted to cause the server to perform a method including storing user account information in a memory circuit, the information associated with specific merchants; receiving login information from a user from a merchant website; accessing an account of the user with the payment provider; causing information for the account of the user, to be displayed on the merchant website; and processing a payment to the merchant from the account of the user.

According to embodiments disclosed herein, a method for providing an account for a customer of a merchant using a server including a processor circuit and a memory circuit may include storing user account information in the memory circuit, the information associated with specific merchants; receiving login information in the processor circuit from a user from a merchant website; accessing with the processor circuit an account of the user with the payment provider; causing information for the account of the user to be displayed on the merchant website using the processor circuit; and processing a payment to the merchant from the account of the user, using the processor circuit.

These and other embodiments of the present invention will be described in further detail below with reference to the following drawings.

BRIEF DESCRIPTION OF THE DRAWINGS

In the figures, elements having the same reference number have the same or similar functions.

DETAILED DESCRIPTION

With the increase of network accessibility for multiple consumer electronic devices such as cellular phones and tablet computers, potential buyers have largely enhanced their purchasing capabilities. Availability of private account service providers holding cash resources remotely located from individual customers further increases purchasing opportunities for potential buyers. The present disclosure includes methods and systems providing a pre-paid merchant wallet available for use by consumers for online transactions. Thus, according to embodiments disclosed herein the opportunity to complete a purchase online is increased, together with sales volume, customer and merchant satisfaction.

According to embodiments disclosed herein a private account service provider creates an account for the customer of a merchant's website using funding instrument information available from the merchant, related to the customer. Funding instrument information may be a bank account number, or a credit card number, associated to the customer. The account created for the customer is a wallet that the customer may use to purchase merchant's items or services listed in the merchant's website. Once the wallet is created, the customer may see wallet's details on the merchant's website each time the customer logs into the merchant website. For example, the user may see the wallet balance, available funds, and history of payments and purchases with the merchant. This may be advantageous for promoting customers to become registered users with the private account service provider. Also, people in distant and remote markets may become familiarized with the services of a private account service provider, prompting people to become registered users.

According to some embodiments, a plurality of merchants may each include a group of customers registered in their websites. A private account service provider may thus provide wallet services to customers from each of the plurality of merchants. Thus, a large group of potential users may familiarize with the quality of service and security offered by the private account service provider. In some embodiments the private account service provider may contact the customers that use wallets, offering user registration with full services beyond a wallet for a specific merchant.

Figure 1:
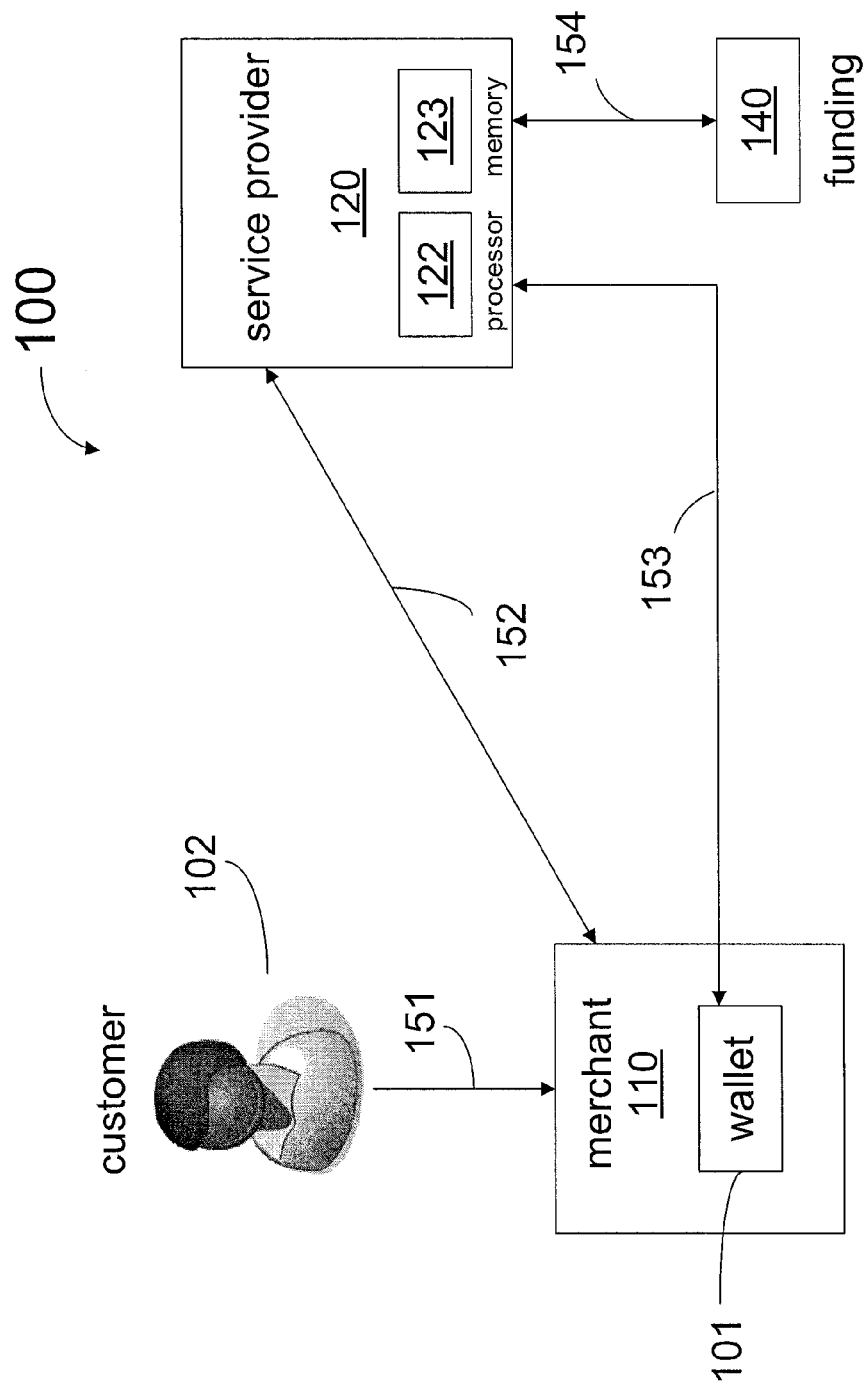
FIG. 1 shows a system for remote purchasing using a wallet, according to some embodiments.

FIG. 1 shows a system 100 for remote purchasing using a wallet 101, according to some embodiments. System 100 includes a customer 102 accessing a merchant's website 110. The merchant's website 110 includes a wallet 101 managed by a private account service provider 120, such as PayPal, Inc. of San Jose, Calif. The wallet includes a balance of funds provided by a funding instrument 140 through the private account service provider 120. Service provider 120 may include a server connected to a network, the server including a computer having a processor circuit 122 and a memory circuit 123.

According to some embodiments, private account service provider 120 creates an account or "wallet" 101 for customer 102 of merchant website 110. Wallet 101 includes information related to customer 102 available from merchant's website 110. Once wallet 101 is created, customer 102 is able to see details of the account or wallet 101 each time customer 102 logs into merchant's web site 110. In some embodiments, customer 102 may be able to see the wallet's balance and available funds. System 100 provides a service for merchants to handle purchasing transactions remotely. System 100 may introduce a vast market of potential users to the benefits of private account service provider 120. Thus, potential users may be interested in registering with service provider 120 for a wide range of financial transactions, beyond what is offered in merchant's website 110.

In some embodiments, private account service provider 120 includes a merchant account. Service provider 120 may also place money into wallet 101 from a funding instrument 140. As the customer uses the balance in the wallet to purchase selected items or services from the merchant, service provider 120 transfers funds form the wallet 101 to the merchant's account with service provider 120. Funding instrument 140 may be a customer bank account or a customer credit card. Information about the customer may be provided to private account service provider 120 by the merchant hosting merchant's website 110. This information may include customer's financial information and transaction records with the merchant.

In some embodiments, customer 102 accesses merchant's website 110 through a remote link 151. Merchant's website 110 and service provider 120 may communicate through a remote link 152. Service provider 120 may operate wallet 101 in merchant's website 110 through remote link 153. Furthermore, service provider 120 may retrieve customer funds from funding instrument 140 through remote link 154. Remote links 151, 152, 153, and 154 may be part of a network, or each may be included in a separate network. According to some embodiments, the network including either of remote links 151, 152, 153, and 154 may be a wireless network, or a cell phone network.

Figure 2:
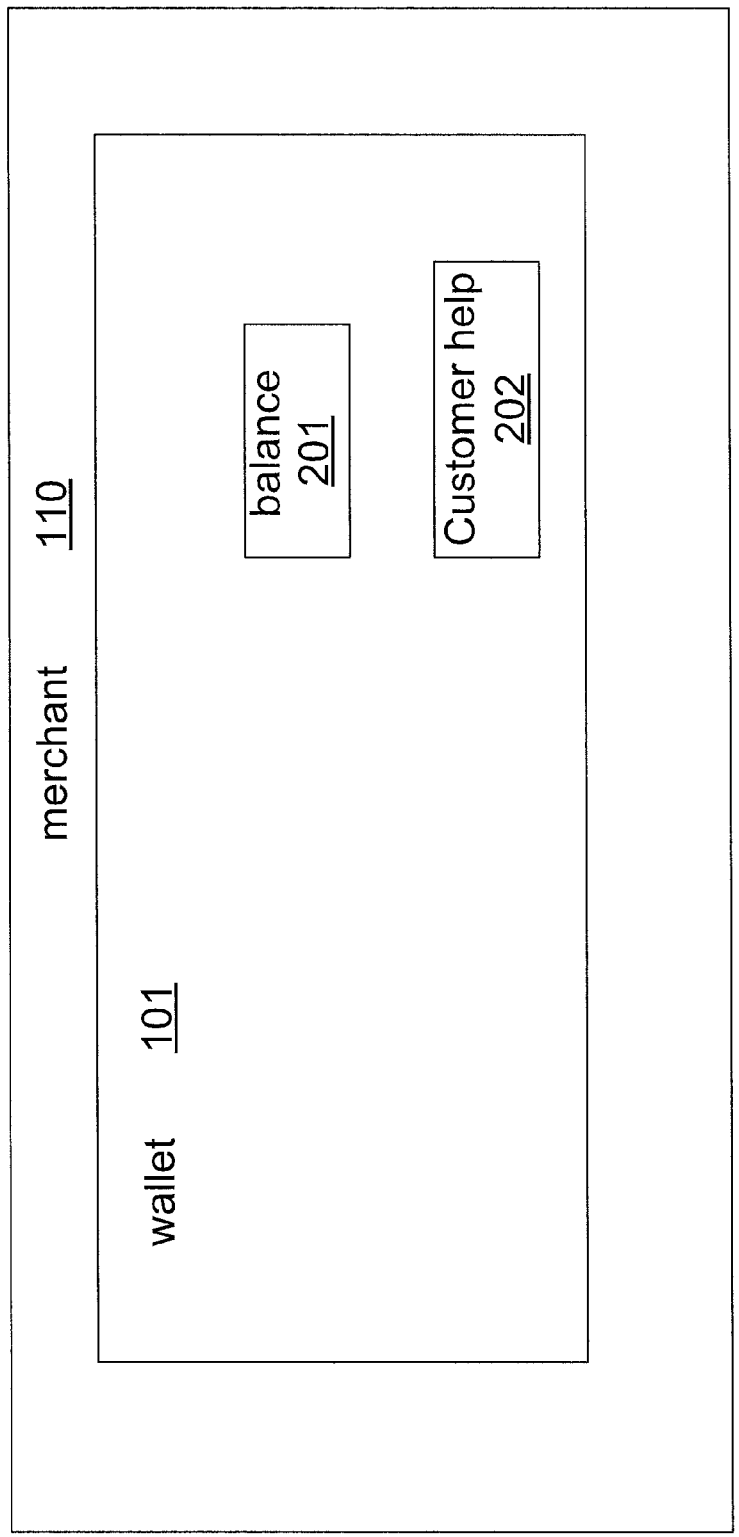
FIG. 2 shows a merchant website including a wallet, according to some embodiments.

FIG. 2 shows merchant website 110 including wallet 101 and a balance field 201, according to some embodiments. Merchant's website 110 may display an icon for wallet 101 when the customer logs in merchant's web site 110. The icon for wallet 101 may be operated by private account service provider 120, including balance field 201. Balance field 201 displays the current balance in the wallet, so that customer 102 may decide to make a purchase, or add more funds into wallet 101. In some embodiments, wallet 101 may further include a customer help link 202, to receive input from customer 102 regarding potential conflicts with the vendor.

When customer 102 having a wallet 101 taps on the customer help link 202, the customer may be able to fill in a field with comments, complaints, and other information related to a potential conflict with the vendor. The data provided by customer 102 through customer help link 202 may be stored by service provider 120 in memory circuit 123. Service provider 120 may place a conflict resolution option in merchant's website 110 to log potential disputes for reference by the merchant, the customer, and the service provider. The customer may thus be able to input conflict information upon tapping on the link. The customer conflict information may be stored in memory circuit 123 by service provider 120.

The customer conflict information may be kept confidential by service provider 120. In some embodiments, the customer conflict information may be provided to the merchant, by service provider 120. Further according to some embodiments, the customer conflict information may be made available to a third party by service provider 120. For example, in some embodiments the customer conflict information may be provided to other customers having similar or related conflicts. In some embodiments the customer conflict information may be provided to a local authority for further processing. According to some embodiments, service provider 120 may use customer conflict information from a plurality of customers to perform a statistical analysis of the quality of management by the merchant. Service provider 120 may further use the statistical information to either cancel the wallet option with a merchant, or provide the merchant with feedback for improvement of the service.

Private account service provider 120 may offer customer 102 to deposit funds into the wallet from a bank account or using a credit card. Wallet 101 allows customer 102 to pay for a purchase of a selected item or group of items from merchant's website 110. When customer 102 decides to use wallet 101 for a purchase, private account service provider 120 credits a merchant account with service provider 120 in the amount of the purchase transaction, and deducts the amount from customer's wallet 101.

Figure 3:
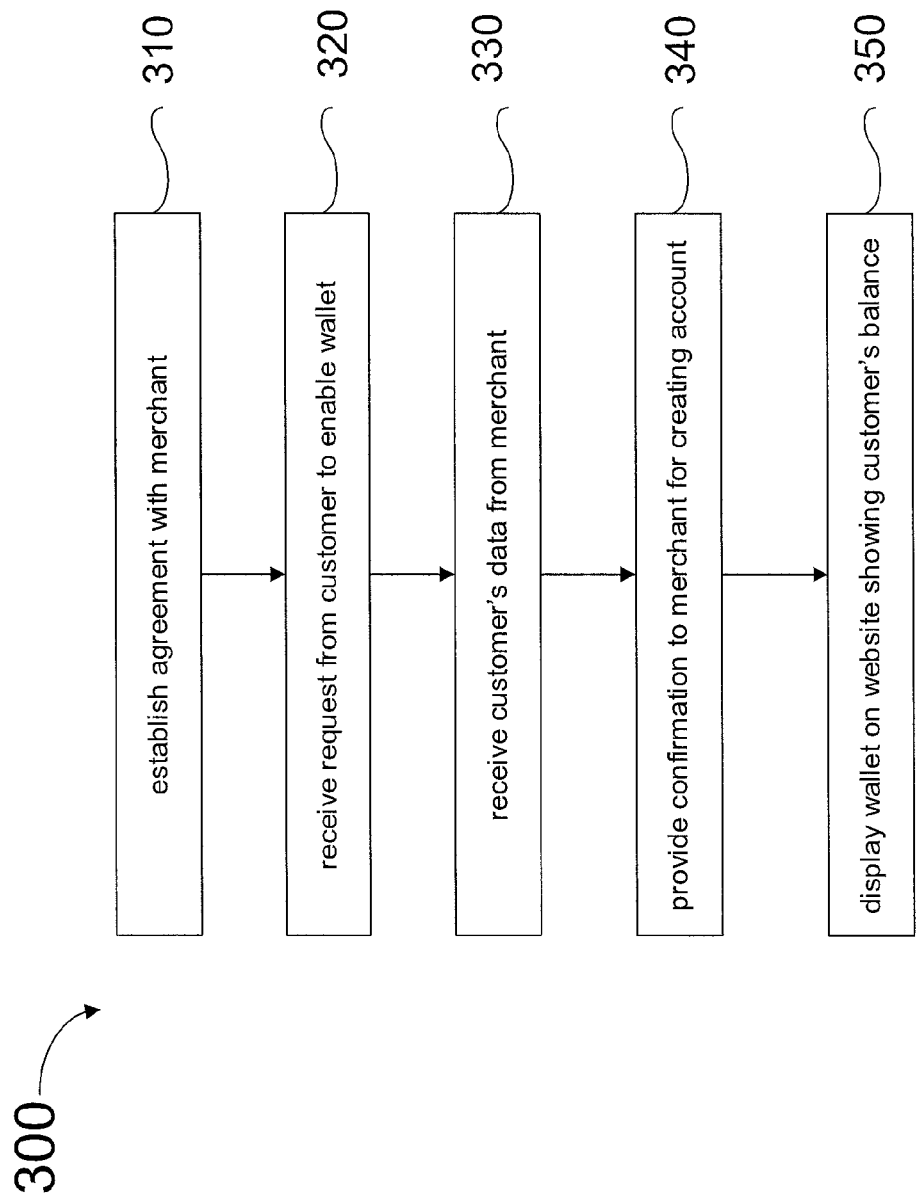
FIG. 3 shows a flow chart of a method for signing up a new customer of a wallet, according to some embodiments.

FIG. 3 shows a flow chart of a method 300 for signing up a new customer to a wallet, according to some embodiments. In some embodiments method 300 may be performed by a merchant hosting merchant's website 110 (cf. FIG. 1). Further according to some embodiments, method 300 may be performed by service provider 120 having links 152 and 153 with merchant's website 110 and having link 154 with funding instrument 140 (cf. FIG. 1). In such embodiments, steps in method 300 may be performed by processor circuit 122 in service provider 120, using information and commands stored in memory circuit 123.

In step 310, service provider 120 establishes an agreement with the merchant. In the agreement, the merchant may allow service provider 120 to place a wallet such as wallet 101 in merchant's website 110 associated to a customer account with the merchant. Furthermore, the merchant may agree for service provider 120 to place a logo or icon advertising the name and brand of service provider 120 servicing wallet 101. In some embodiments, the merchant may also register as a user in private account service provider 120, in step 310.

In step 320, a request from customer 102 to enable wallet 101 is received in merchant's website 110. For example, in some embodiments customer 102 may select a link or tap on an icon in merchant's website 110, requesting the merchant to enable wallet 101. In step 330, service provider 120 receives data related to customer 102 exported by the merchant. In some embodiments, the data received by service provider 120 in step 330 may be stored in memory circuit 123. The data may include customer information, such as name, email address, phone number, billing address, shipping address, and any other relevant information needed by the service provider to create an account. The customer data exported in step 330 by the merchant may include customer financial information such as a bank account number or a credit card number, and a payment history between merchant and customer 102. The bank account number or the credit card number may be used by private account service provider 120 to access funding instrument 140 and transfer funds into wallet 101, upon customer's request and authorization. The payment history enables private account service provider 120 to assess the risk posed by customer 102.

In step 340, service provider 120 creates a customer account as a wallet and provides the merchant confirmation. The wallet account created by service provider 120 may be linked to the merchant. For example, service provider 120 may include a merchant identifier in the customer account, to recognize a wallet 101 associated with the merchant. Thus, when the customer performs a purchase through wallet 101, service provider 120 may transfer the funds from wallet 101 to a merchant's account with service provider 120. According to some embodiments, wallet 101 is managed by the merchant, through merchant's webpage 110. The account linked to the merchant includes wallet 101 is displayed to the customer on the merchant website, in step 350, when the customer logs into the merchant's website 110. In step 350, service provider 120 may give the merchant information to display balance 201 in wallet 101 for customer 102. The balance may be current balance or available balance for purchasing with the merchant. Once wallet 101 is created, service provider 120 is able to retrieve funds from funding instrument 140 and provide a balance to wallet 101, upon customer's request and confirmation, as detailed below in FIG. 4. According to some embodiments, wallet 101 created in method 300 may be linked to the merchant hosting merchant's website 110. That is, the merchant may still have full authority on the wallet's balance, and access to all information from the customer contained in wallet 101. Thus, in some embodiments service provider 120 is limited to providing funds to wallet 101 from funding instrument 140, and allocating funds from wallet 101 into a merchant's account with service provider 120.

In some embodiments, some of the steps described in detail above in relation to method 300 may be performed by the merchant using an application program interface (API) provided by service provider 120. Service provider 120 presents the newly created account as a wallet 101 that shows in the customer's login account in merchant's website 110. The newly created wallet 101 may have limited services with service provider 120, as it is accessed through the merchant's website. According to some embodiments, wallet 101 created as in method 300 may be under care of merchant's website 110. Thus, the merchant may deduct a balance in wallet 101 on behalf of the customer, for purchases. In some embodiments, wallet 101 may be under direct management of service provider 120 since custom wallets may be risky and costly to maintain for a single merchant. Thus, service provider 120 may offer its expertise and reliability to operate and maintain wallet 101 for merchant's website 110.

According to some embodiments of method 300, a merchant may save the fee paid a bank or credit card on multiple transactions. Thus, once a money amount is placed in wallet 101, several purchases in merchant's website 110 may be performed without paying a transaction fee to a bank or a credit card, from the merchant. Customer 102 also saves fee's levied by a bank (e.g., IRCTC) or credit card, upon multiple transactions.

Embodiments of method 300 provide a mass signup of potential users into service provider 120 since all of merchant's customers are potential users of service provider 120. The merchant will also be a user of service provider 120, according to some embodiments. Thus, in some embodiments service provider 120 may offer discounted services to the merchant in order to be able to manage wallets 101 for the merchant's customers. In this manner, service provider 120 may advertise its services in new markets by leveraging the merchant's popularity. Thus, marketing costs for service provider 120 to enter new geographic areas are reduced. Embodiments consistent with method 300 are desirable for service provider 120, since fraud risk with new customer signups is directly assessed through the customer's payment history with merchant.

In some embodiments, method 300 for signing up a new user of a wallet may include service provider 120 returning the funds in wallet 101 to funding instrument 140. For example, service provider 120 may return funds in wallet 101 to customer 102 through funding instrument 140 when the merchant hosting merchant's website 110 decides to cut ties with service provider 120.

Figure 4:
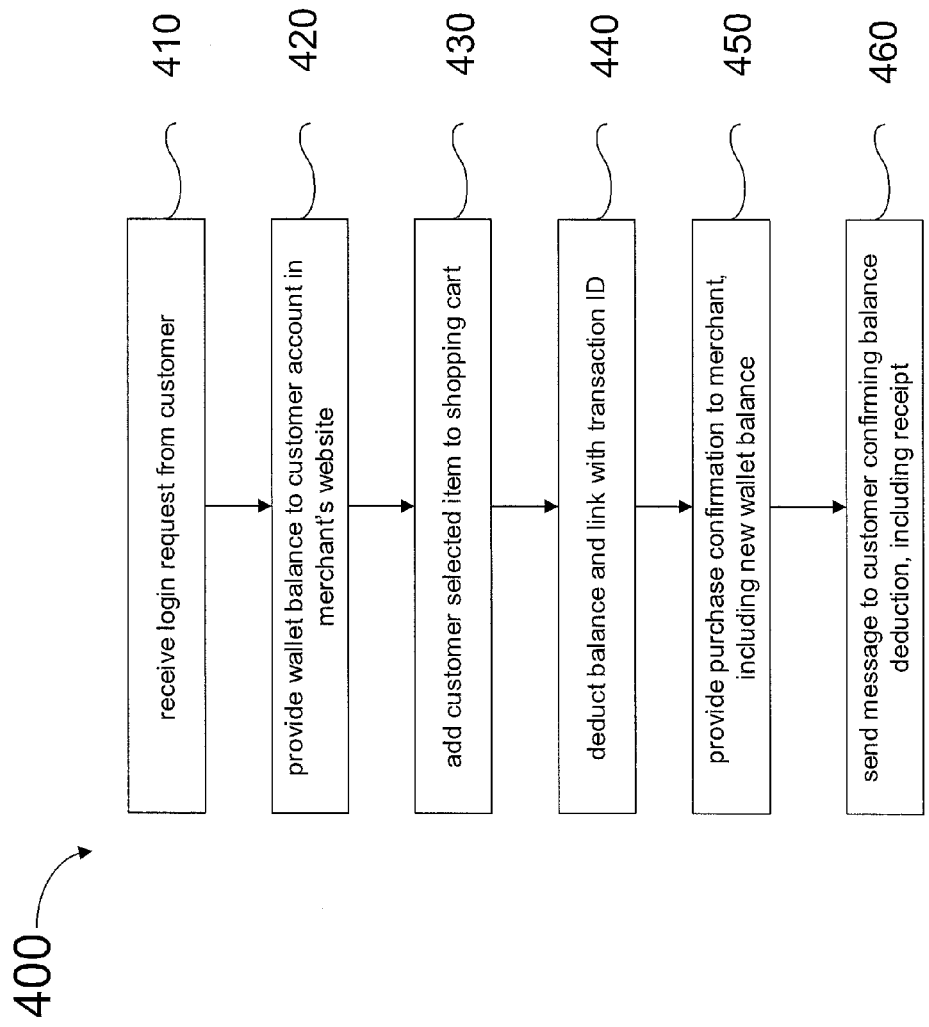
FIG. 4 shows a flow chart of a method for remote purchasing using a wallet, according to some embodiments.

FIG. 4 shows a flow chart of a method 400 for remote purchasing using a wallet on a merchant site, according to some embodiments. Method 400 may be performed by the merchant hosting merchant's website 110. Further according to some embodiments, method 400 may be performed by service provider 120 having links 152 and 153 with merchant's website 110 and having link 154 with funding instrument 140 (cf. FIG. 1). In such embodiments, steps in method 400 may be performed by processor circuit 122 in service provider 120, using information and commands stored in memory circuit 123.

In step 410, a login request is received from customer 102. Customer 102 may have a wallet account 101 with service provider 120. According to some embodiments, a login request may include the use of a customer identification information, such as a user name, e-mail address, or phone number, and a password or personal identification number (PIN) for a customer account in merchant's website 110. In some embodiments wallet 101 may be a pre-paid wallet, so that there is a positive balance in the wallet, and the customer may purchase an item when there is enough balance in wallet 101 to do so. In some embodiments, depending on the customer payment history with the merchant, the merchant may allow the customer to make a purchase for an item as long as a pre-established purchase limit is not exceeded. Thus, in some embodiments the customer may use wallet 101 to purchase an item that exceeds the balance available in the wallet. In such embodiments, the merchant may request customer 102 to further authorize service provider 120 to retrieve funds from funding instrument 140 to complete the balance of wallet 101 in the transaction. In step 420, service provider 120 provides the wallet balance to display in merchant's website 110, for customer 102.

In step 430 an item selected by customer 102 is added into a shopping cart. The shopping cart may also be displayed in merchant's website 110. In step 440 a balance is deducted from wallet 101 according to the sum of the cost of the items in the shopping cart, after customer 102 decides to make a purchase. In step 440, a link to service provider 120 using a transaction identifier (ID) may be created, so that service provider 120 may store the purchase information in memory circuit 123, for reference. The link may include information about the purchase to be stored by service provider 120. Thus, service provider 120 may transfer funds from wallet account 101 to a merchant's account, in the amount of the transaction. In step 450, service provider 120 provides the merchant with a purchase confirmation once the funds have been transferred from wallet 101 to the merchant's account. In step 460 a message is sent to customer 102 confirming balance deduction and including a receipt for the purchase.

According to some embodiments, the message in step 460 is sent by the merchant. In some embodiments, the message in step 460 is sent by service provider through the merchant, using links 152 and 151 (cf. FIG. 1).

According to some embodiments, a merchant may find method 400 for remote purchasing convenient. Indeed, the number of failed transactions due to bad network or busy merchant website 110 is reduced. In fact, service provider 120 may enable security options and safe wards to restore the transaction in case of a network failure. Furthermore, service provider 120 may offer a safe network of servers that guarantees data security and transaction reliability. Customer 102 may also find method 400 for remote purchasing convenient, since it offers a faster checkout process, essentially instantaneous. Also, according to embodiments consistent with method 400 the purchase is completed by only a tap by the user. The user does not need to input any further information or code to complete the transaction.

Figure 5:
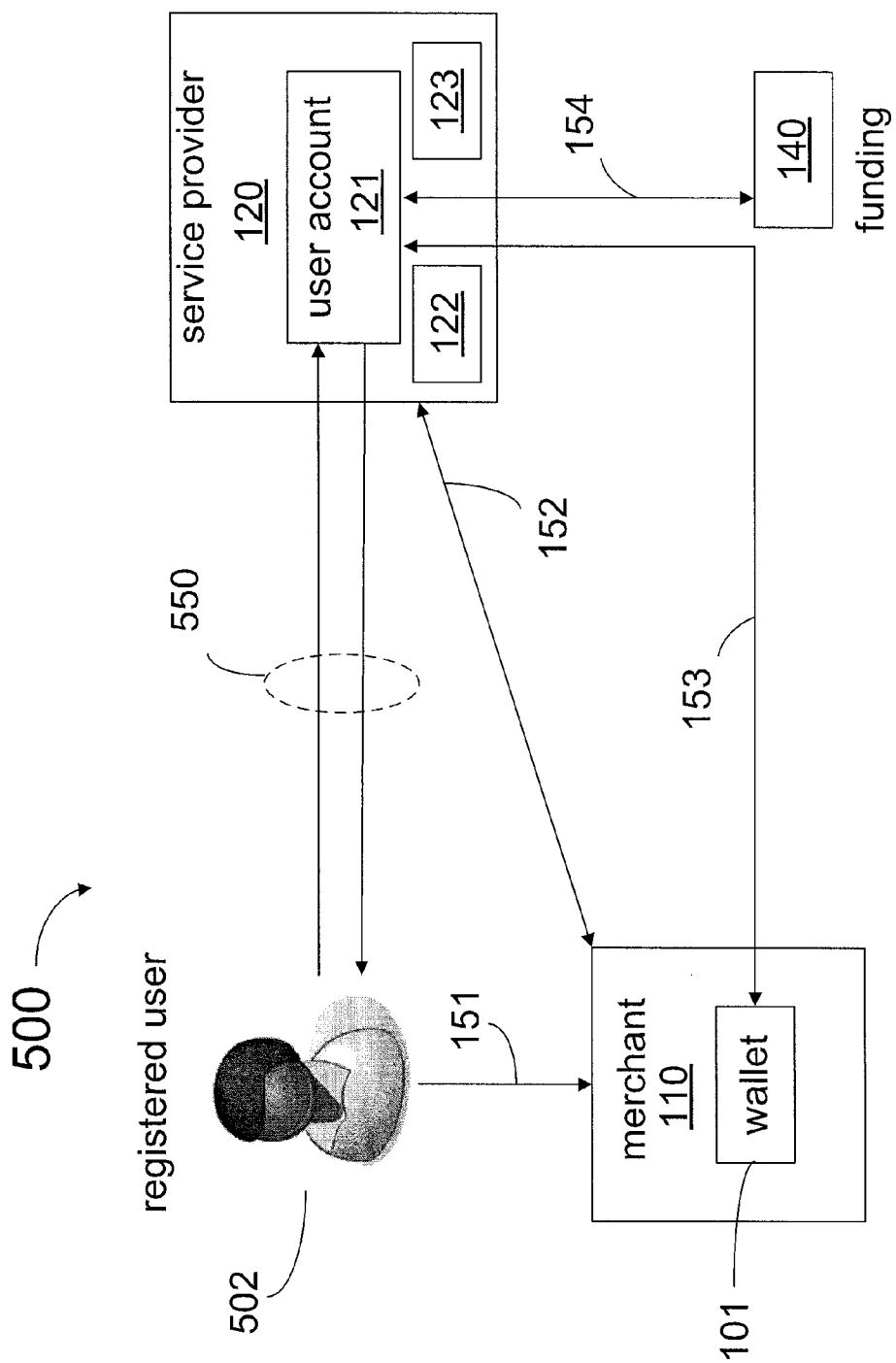
FIG. 5 shows a system for remote purchasing using a wallet, according to some embodiments.

FIG. 5 shows a system 500 for remote purchasing using wallet 101, according to some embodiments. FIG. 5 illustrates a registered user 502 which may have an account 121 with private account service provider 120. Registered user 502 may also have a wallet account 101 in merchant's website 110, serviced by service provider 120. FIG. 5 illustrates link 151 between registered user 502 and merchant's website 110, link 152 between merchant's website 110 and service provider 120, link 153 between wallet 101 in merchant's website 110 and service provider 120, and link 154 between funding instrument 140 and user account 121. Links 151, 152, 153, and 154 are as described in detail above, in relation to FIG. 1. According to some embodiments, system 500 may include link 550 between registered user 502 and service provider 120. Link 550 may include an internet link, or a wireless link such as provided by a cell phone network.

FIG. 5 also illustrates funding instrument 140 coupled to service provider 120 through user account 121. User account 121 includes information about wallet 101, such as purchase history between registered user 502, the merchant hosting merchant's website 110, and balance information about wallet 101. User account 121 may also include information about funds available for registered user 502 to purchase items or services other than those offered in merchant's website 110. Thus, funding instrument 140 may be used by registered user 502 to pull funds into user account 121, and the funds may be used for any purchasing transaction of registered user 502, regardless of whether or not the item or service selected for the transaction is offered in merchant's website 110.

In some embodiments, when service provider 120 creates wallet 101 for customer 102, service provider 120 may offer customer 102 to become a registered user with service provider 120. Customer 102 may thus become a registered user with service provider 120. The registered user account may include further personal information provided by customer 102 to service provider 120. Personal information for the registered user may be stored in a database within service provider 120. The registered user may use the account in service provider 120 for financial transactions and purchases other than the merchant's items and services. In such embodiments the user of service provider 120 may still have an account in merchant's website 110, including wallet 101. Wallet 101 may be linked to the user account 121 with service provider 120, such that funds may be transferred into wallet 101 by service provider 120 per registered user's request. User 502 may access user account 121 through link 550, by providing a personal identification number (PIN) unique for user's account 121 in service provider 120. The PIN used by user 502 to access account 121 in service provider 120 may be the same as the PIN used by user 502 to access wallet 101, according to some embodiments. In some embodiments, user 501 may access wallet 101 in vendor's webpage 110 using a PIN, and once user 502 is logged into wallet 101, service provider 120 may recognize the PIN and provide user 502 with access to account 121.

Further according to some embodiments, user 502 may already be a registered user of service provider 120 before enabling wallet 101 in merchant's website 110. Thus, in some embodiments service provider 120 may include user account 121 prior to enabling wallet 101. In such embodiments, service provider 120 may link user account 121 to wallet 101, upon request from user 502. In such embodiments, user 502 may be given fully enabled wallet features, as described in detail below in relation to FIG. 6.

Figure 6:
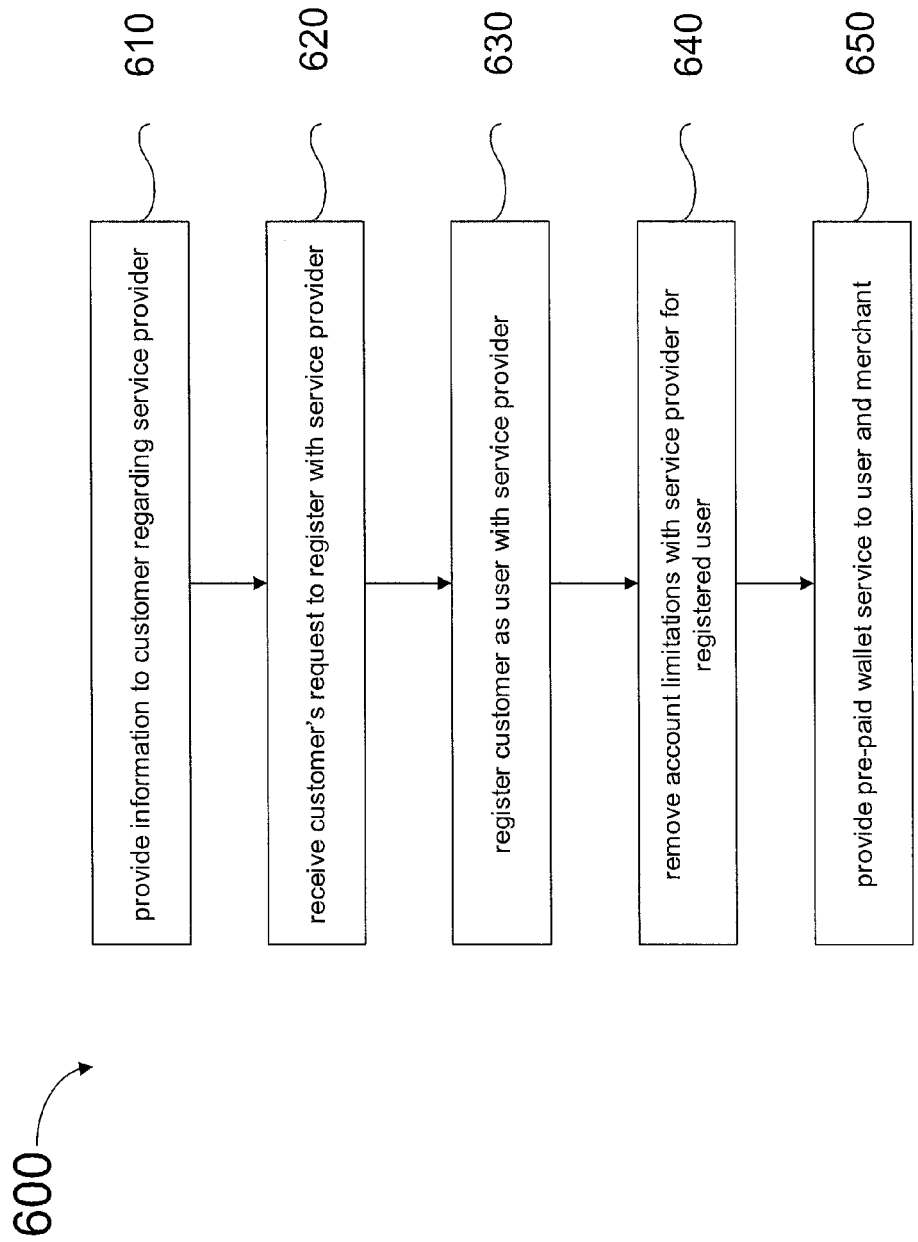
FIG. 6 shows a flow chart of a method for user discovery, according to some embodiments.

FIG. 6 shows a flow chart of a method 600 for user discovery according to some embodiments. In some embodiments, method 600 is performed by private account service provider 120 once customer 102 has created wallet 101 through merchant's website 110. In step 610 service provider 120 provides information to customer 102, regarding account registration with service provider 120. In some embodiments, service provider 120 performs step 610 once customer 102 has logged in to an account with merchant website 110. For example, customer 102 may log into an account in merchant's website 110 providing a login name, a user name, an e-mail address, or a phone number. Further, customer 102 may use a password, or a PIN, to access the customer account in merchant's website 110.

In step 620, service provider 120 receives a request from customer 102 to register as a user with service provider 120. In some embodiments, step 620 may include importing user data via an API provided to customer 102 by service provider 120. In step 630 service provider 120 registers customer 102 as a user. In some embodiments step 630 includes the user agreeing to the terms of service (T&S) of service provider 120.

In step 640, service provider 120 removes any account limitations that the newly registered user may have had in wallet 101. According to some embodiments consistent with the present disclosure, when a user is already a registered user of service provider 120, method 600 may start with step 640, including service provider 120 linking a wallet 101 with user account 121. Step 640 may include giving wallet 101 all privileges and access to user account 121.

In step 650, service provider 120 provides a wallet service to the registered user and to the merchant. Step 650 may include supporting merchant's website 110 in performing steps 410 through 460, described in detail above in relation to method 400 (cf. FIG. 4).

Figure 7:
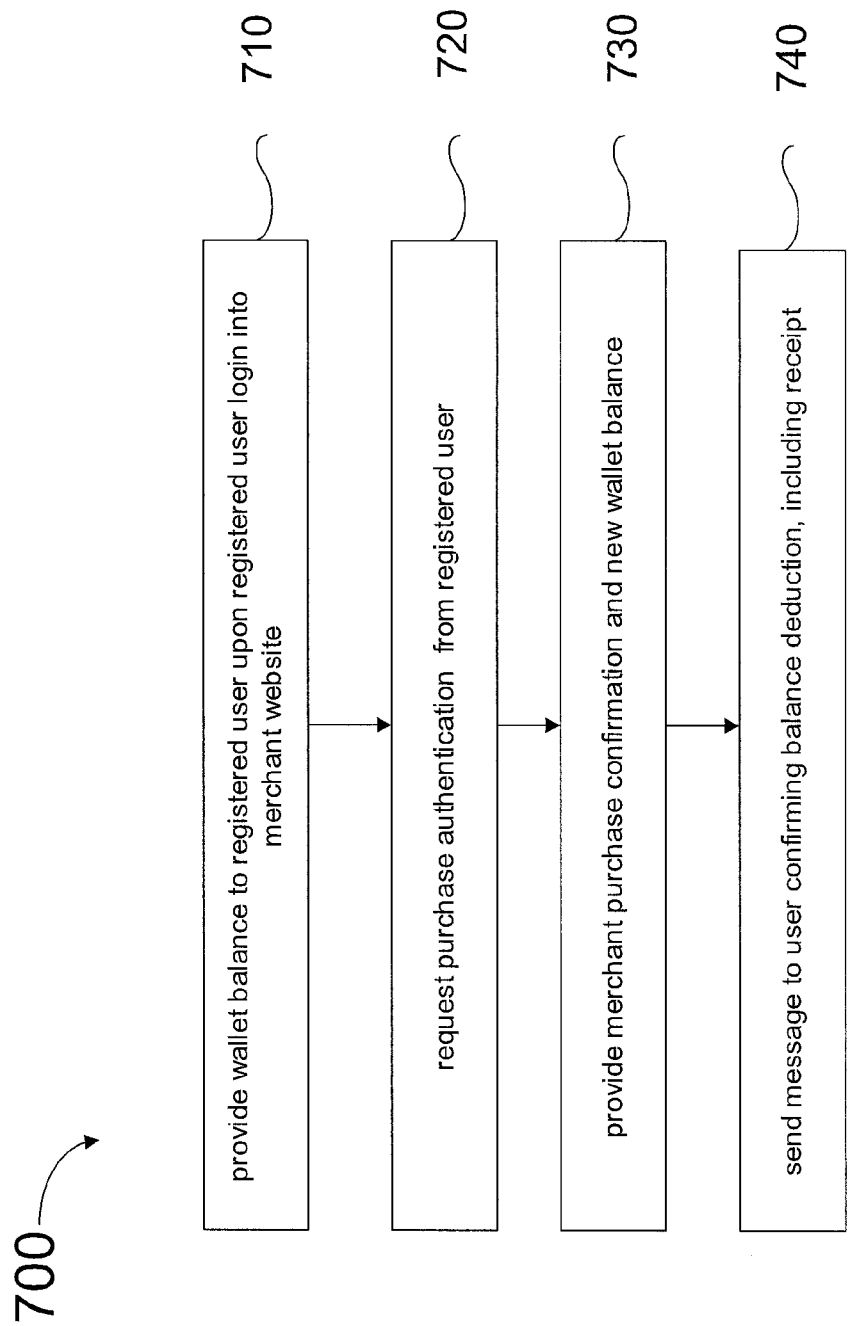
FIG. 7 shows a flow chart of a method for remote purchasing using a wallet, according to some embodiments.

FIG. 7 shows a flow chart of a method 700 for remote purchasing using a wallet, according to some embodiments. Method 700 may be performed by service provider 120 when a registered user having wallet 101 selects an item or service from merchant's website 110 for purchase. Thus, according to some embodiments, method 700 includes registered user 502 having an account 121 with service provider 120 and also a wallet 101 in a merchant's website 110 (cf. FIG. 5). According to some embodiments, registered user 502 may be a customer of a merchant, as customer 102. In step 710 service provider 120 provides a wallet balance to the registered user 502 upon registered user 502 login into merchant's website 110. In some embodiments, registered user 502 may log into merchant's website 110 using a login name, an e-mail address, or a phone number including a password or a PIN.

In step 720 service provider 120 requests from registered user 502 a purchase authentication. Step 720 may be performed by a direct communication between service provider 120 and registered user 502. In some embodiments, while registered user 502 may request the purchase using link 151 to merchant's website 110, service provider 120 may request confirmation from registered user 502 through communication link 550. For example, while registered user 502 may connect to merchant's website 110 through network link 151, service provider 120 may call registered user 502 through a cell phone or e-mail link 550 in step 720.

In step 730, service provider 120 provides the merchant with a purchase confirmation by registered user 502, including the new balance in wallet 101 for registered user 502. In step 740 service provider 120 sends a message to registered user 502 confirming the balance reduction in wallet 101, including a purchase receipt. In some embodiments the message may be a short-message-service (SMS) message to the registered user, or a phone message through a cell phone network, or an e-mail message through a network.

Figure 8:
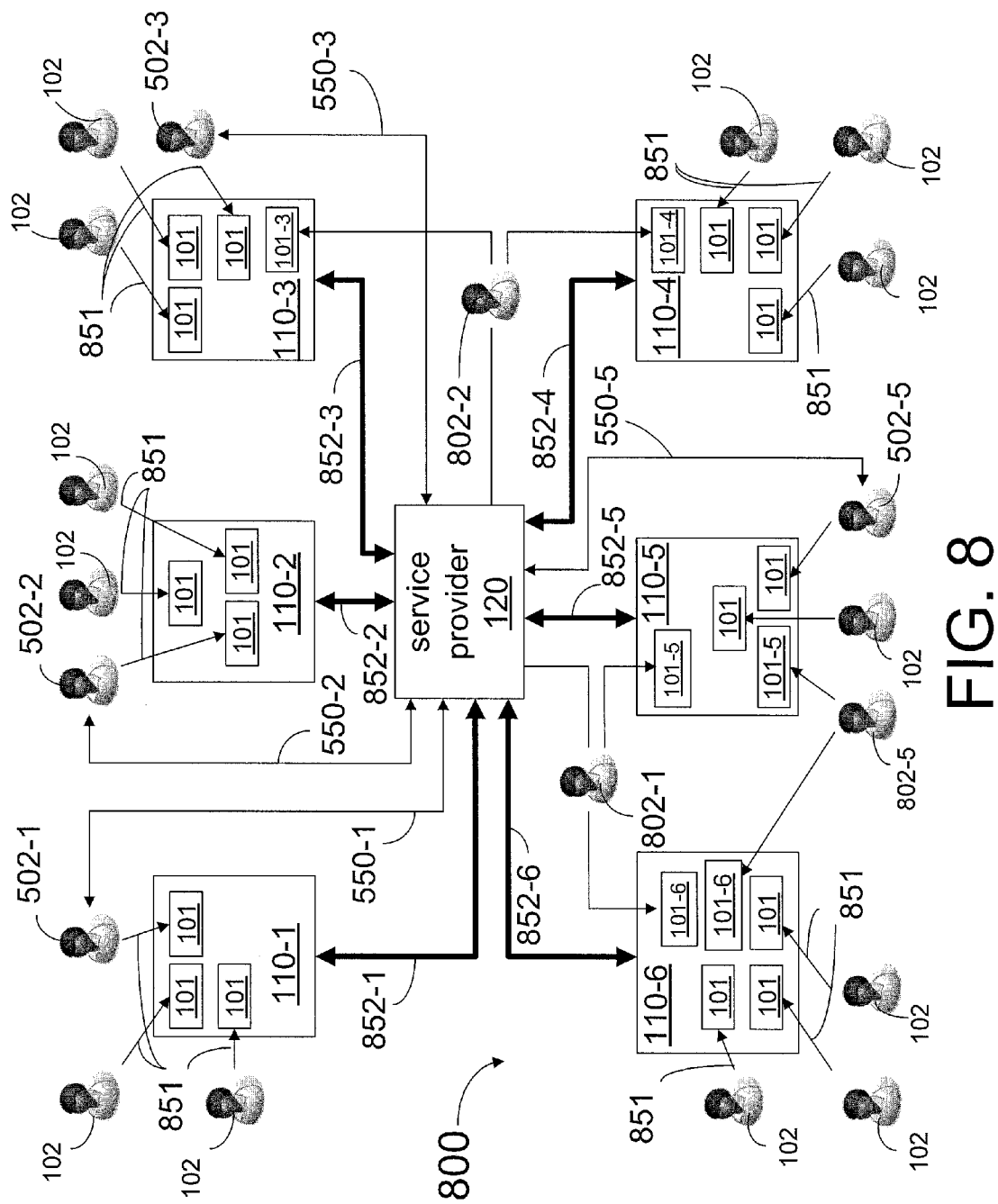
FIG. 8 shows a system for remote purchasing using a wallet, according to some embodiments.

FIG. 8 shows a system 800 for remote purchasing using a prepaid wallet 101, according to some embodiments. FIG. 8 illustrates service provider 120 and a plurality of websites 110-1 through 110-6 (collectively referred to as websites 110). Each one of websites 110 may be hosted by a different merchant offering different types of items and services. Also, each website 110 in FIG. 8 may have a group of customers 102, each customer having a wallet 101 such as described above in relation to FIGS. 1 and 5. Furthermore, as illustrated in FIG. 8, some customers may also be registered users of service provider 120, such as registered users 502-1, 502-2, 502-3, and 502-5.

FIG. 8 illustrates links 852-1, 852-1, 852-3, 852-3, 852-5, and 852-6, collectively referred to as links 852. Links 852 couple websites 110 to source provider 120, as link 152, described in detail above (cf. FIG. 1). FIG. 8 also illustrates links 851 between customers 102 and wallets 101. Links 851 may be as link 151 described in detail above (cf. FIG. 1). Links 550-1, 550-2, 550-3 and 550-5 may be as link 550, described in detail above (cf. FIG. 5).

Some embodiments of system 800 may include registered users 802-1 and 802-2, collectively referred to as registered users 802. Registered users 802 may have an account with service provider 120 through which registered users 802 may operate more than one wallet 101 for more than one merchant. For example, registered user 802-1 may have a wallet 101-5 with merchant's website 110-5, and a wallet 101-6 with merchant's website 110-6. Each of wallets 110-5 and 110-6 may be handled separately by service provider 120. In some embodiments, service provider 120 may transfer funds from wallet 101-5 to wallet 101-6 and vice-versa, upon request by registered user 802-1. Furthermore, according to some embodiments, service provider 120 may transfer funds from a different account of registered user 802-1 into either of wallets 101-5 and 101-6. Service provider 120 may provide similar flexibility in management of wallets 101-4 and 101-3 for registered user 802-2. Thus, in some embodiments a registered user 802 may handle multiple wallets 101 with multiple merchants, through service provider 120, independently of one another. For example, a merchant hosting merchant's website 110-4 may have access to customer data related to wallet 101-4, such as account balance and payment history. However, the merchant hosting merchant's website 110-4 may not have access to customer data related to wallet 101-3 in merchant's website 110-3, even though wallets 101-3 and 101-4 are associated to registered user 802-2.

As FIG. 8 shows, some embodiments of system 800 enable service provider 120 to access a large network of customers 102 that may become registered users 802. In order to incentivize adoption of the use of wallet 101 through service provider 120, service provider 120 may offer customers 102 credit points for certain amount of money spent in merchant's website 110 through wallet 101.

In geographic areas where service provider 120 desires to open new markets, some embodiments consistent with the present disclosure may enable wallet 101 for a limited amount of time, according to local banking regulations. In such configuration, either the merchant or service provider 120 may return the funds left in wallet 101 upon expiration time to funding instrument 140. Further, according to local banking regulations, service provider 120 may not allow customers 102 to retrieve money out of wallet 101, and only use wallet 101 for purchasing goods and services.

In some embodiments, service provider 120 may provide an 'opt-me-out' option to customers 102. Thus, for a customer 102 that desires to stay out of the network of service provider 120, customer 102 may still have wallet 101 with merchant's website 110. In such embodiments service provider 120 may put the balance of 'opt-me-out' customer in a proxy account associated to the merchant, who may have an account with service provider 120. The merchant may handle each of 'opt-me-out' customer's balance in the proxy account.

In some embodiments of system 800 customer 102 may not be a registered user with service provider 120. Furthermore, in some embodiments a customer 102 may have a wallet 101 with each of two merchants. This is illustrated in FIG. 8 by customer 802-5 having wallet 101-5 in merchant's website 110, and wallet 101-6 in merchant's website 110-6. In some embodiments, if customer 802-5 is not a registered user of service provider 120, customer 802-5 may not use the balance in wallet 101-5 to pay for an item in merchant's website 110-6. In some embodiments, if customer 802-5 is a registered user of service provider 120, and if wallets 101-5 and 101-6 are offered by service provider 120, customer 802-5 may use the balance in wallet 101-5 to purchase an item in merchant's website 110-6.

Embodiments of the invention described above are exemplary only. One skilled in the art may recognize various alternative embodiments from those specifically disclosed. Those alternative embodiments are also intended to be within the scope of this disclosure. As such, the invention is limited only by the following claims.

What is claimed is:

1. A system comprising:
   a non-transitory memory; and
   one or more hardware processors coupled to the non-transitory memory and configured to read instructions from the non-transitory memory to cause the system to perform operations comprising:
   receiving, through an application program interface (API), login information for a user of a payment provider from a merchant website associated with a merchant via a first network link;
   retrieving, in response to receiving the login information, a current balance for a wallet account associated with the user and associated with a merchant identifier corresponding to the merchant;
   transmitting, using the first network link, the current balance for the wallet account to the merchant website, the transmitting causing the merchant website to display the current balance for the wallet account;

receiving, via the first network link and the API, a payment request from the merchant web site;

transmitting, to a mobile device of the user, a confirmation request via a second network link in response to receiving the payment request and without using the merchant website, the second network link being separate from the first network link;

receiving, via the second network link and in response to the confirmation request, a confirmation from the mobile device of the user;

without redirecting the user from the merchant website automatically transferring funds between a funding instrument and the wallet account, responsive to determining a predefined condition associated with the current balance of the wallet account is met; and processing a payment for the payment request to an account of the merchant from the wallet account, in response to receiving the confirmation from the mobile device of the user.

2. The system of claim 1, wherein the operations further comprise:
   accessing, based on the login information, the funding instrument having user funds; and
   transferring funds from the funding instrument into the wallet account.

3. The system of claim 1, wherein the current balance of the wallet account is used for purchasing items from the merchant website.

4. The system of claim 1, wherein the operations further comprise:
   receiving, via the API and through the first network link, a personal identification number (PIN) associated with the wallet account; and
   processing user payments through the first network link.

5. A non-transitory machine-readable medium having stored thereon machine-readable instructions executable to cause a machine to perform operations comprising:
   receiving, through an application program interface (API), login information for a user from a merchant website associated with a merchant via a first network link;
   retrieving, in response to receiving the login information, a current balance for a wallet account associated with the user and associated with a merchant identifier corresponding to the merchant;
   transmitting, via the first network link, the current balance for the wallet account to the merchant website, the transmitting causing the merchant website to display the current balance for the wallet account;
   receiving, via the first network link and the API, a payment request from the merchant website;
   transmitting, to a mobile device of the user, a confirmation request via a second network link in response to receiving the payment request and without using the merchant website, the second network link being separate from the first network link;
   receiving, via the second network link and in response to transmitting the confirmation request, a confirmation from the mobile device of the user;
   without redirecting the user from the merchant website automatically transferring funds between a funding instrument and the wallet account, responsive to determining a predefined condition associated with the current balance of the wallet account is met;
   processing a payment for the payment request to an account of the merchant from the wallet account in response to receiving the confirmation from the mobile device of the user;
   determining whether the user is registered with a payment provider operating the machine; and
   limiting use of the wallet account based on the determining.

6. The non-transitory machine-readable medium of claim 5, wherein the current balance of the wallet account is used for purchasing items from the merchant web site.

7. The non-transitory machine-readable medium of claim 5, wherein the operations further comprise:
   accessing, based on the login information, the funding instrument having user funds;
   transferring funds from the funding instrument to the wallet account; and
   returning, upon expiration of a predetermined period, the current balance of the wallet account to the funding instrument.

8. The non-transitory machine-readable medium of claim 5, wherein the operations further comprise:
   providing information to the user regarding a service provided by the payment provider;
   receiving, via the API, a request from the user to register as a user of the service of the payment provider; and
   in response to the registration, removing account limitations for the wallet account.

9. The non-transitory machine-readable medium of claim 5, wherein the user is a registered user of the payment provider.

10. A method comprising:
    receiving, by an application program interface (API) at a server having one or more hardware processors and a non-transitory memory, login information for a user from a merchant website associated with a merchant via a first network link;
    retrieving, by the server in response to receiving the login information, a current balance of a wallet account from the non-transitory memory, the wallet account being associated with the user and associated with a merchant identifier corresponding to the merchant;
    transmitting, via the first network link, the current balance for a wallet account to the merchant website, the transmitting causing the merchant website to display the current balance for the wallet account;
    receiving, via the API and the first network link, a payment request from the merchant website;
    transmitting, via a second network link separate from the first network link, a confirmation request to a mobile device of the user in response to receiving the payment request;
    receiving, via the second network link and in response to the confirmation request, a confirmation from the mobile device of the user;
    without redirecting the user from the merchant website automatically transferring funds between a funding instrument and the wallet account, responsive to determining a predefined condition associated with the current balance of the wallet account is met; and
    processing a payment for the payment request to an account of the merchant from the wallet account in response to receiving the confirmation from the mobile device of the user.

11. The method of claim 10, further comprising:
transmitting, via the first network link, a purchase confirmation to the merchant, the purchase confirmation including an updated current balance for the wallet account; and
transmitting, via the second network link, a message to the mobile device of the user confirming the updated current balance for the wallet account.

12. The method of claim 11, further comprising:
accessing, based on the login information, the funding instrument having user funds; and
transferring funds from the funding instrument to the wallet account.

13. The method of claim 12, further comprising:
communicating with the mobile device of the user, the merchant, and the funding instrument through a single network.

14. The method of claim 12, further comprising:
in response to receiving, by the server, the confirmation from the mobile device, deducting the payment from the current balance to update the current balance of the wallet account;
transmitting, using the first network link, a purchase confirmation to the merchant web site;
causing the merchant website to display the current balance for the wallet account when the user logs on the merchant website; and
returning, upon expiration of a predetermined period, the current balance of the wallet account to the funding instrument.

15. The method of claim 10, wherein transmitting the confirmation request to the mobile device of the user comprises one or more of transmitting a short message system message, transmitting an email, or making a phone call.

16. The method of claim 10, wherein receiving the confirmation comprises receiving a PIN from the mobile device of the user, the PIN being associated with the wallet account.

17. The method of claim 10, wherein receiving the confirmation from the mobile device of the user comprises one or more of receiving a short message system message, receiving an email, or receiving the confirmation over a phone line.

18. The method of claim 10, further comprising:
providing a customer help line accessible through the first network link on the merchant website.

* * * * *